United States Patent [19]

Lafforgue et al.

[11] Patent Number: 4,943,192

[45] Date of Patent: Jul. 24, 1990

[54] DRILL BIT HAVING A SHANK WITH GROOVES

[75] Inventors: Jean-Jacques Lafforgue, Tournon; Claude Schwartz, Gournay S/Marne, both of France

[73] Assignee: Societe de Prospection et D'Inventions Techniques (S.P.I.T.)

[21] Appl. No.: 384,369

[22] Filed: Jul. 25, 1989

[30] Foreign Application Priority Data

Aug. 5, 1988 [FR] France ........ 88 10616

[51] Int. Cl.[5] ........ B23B 51/02

[52] U.S. Cl. ........ 408/226; 279/19

[58] Field of Search ........ 408/226, 240; 279/19, 279/19.3, 75

[56] References Cited

U.S. PATENT DOCUMENTS

| | | | |
|---|---|---|---|
| 4,107,949 | 8/1978 | Wanner et al. | 279/75 |
| 4,512,692 | 4/1985 | Nielsen | 408/226 |
| 4,655,651 | 4/1987 | Hunger et al. | 408/226 |
| 4,691,929 | 9/1987 | Neumaier et al. | 279/19.3 |
| 4,702,651 | 10/1987 | Kleine | 408/226 |
| 4,717,292 | 1/1988 | Phillips | 408/226 |
| 4,840,519 | 6/1989 | Kleine | 408/226 |

FOREIGN PATENT DOCUMENTS

| | | | |
|---|---|---|---|
| 2650134 | 5/1978 | Fed. Rep. of Germany | 279/19 |

*Primary Examiner*—Daniel Howell
*Attorney, Agent, or Firm*—Schwartz & Weinrieb

[57] ABSTRACT

The present invention is directed toward a drill bit which firstly comprises two locking grooves (1,1') diametrically opposed with respect to each other, and secondly, also diametrically opposed, with respect to each other, a first driving groove (3) and a second driving groove (4) associated with a locking groove (2) by being superimposed thereon. The driving groove (4) is advantageously angularly offset with respect to the associated locking groove (2) so as to have, in the drill bit driving zone, the lateral faces of the two associated grooves almost merged. This permits an extension of the friction zone so as to increase the wear resistance thereof, while the opposite lateral faces or edges of the superimposed grooves defines projecting locking surfaces (7) insuring proper locking of the drill bit.

4 Claims, 1 Drawing Sheet

DRILL BIT HAVING A SHANK WITH GROOVES

FIELD OF THE INVENTION

The present invention relates generally to drill bits and more particularly to a drill bit provided with locking and driving grooves within the shank portion thereof so as to enhance the locking and wear resistance characteristics thereof.

BACKGROUND OF THE INVENTION

In percussion drilling machines, it is known that the tool holder comprises at least one ball or cylinder type locking part able to move in a substantially radial direction, which limits the axial mobility of the rod or drill bit, by penetrating the cavities of the latter, the cavities being closed upon both sides in the axial direction thereof.

In certain ones of these drilling machines as described, for example, in the patent FR-1 588 841 (HILTI), these balls or cylinders ensure, not only slidable locking, but also rotary locking by adopting the role of a carrier.

In other drilling machines as described in the patent FR-A-76 34 195 (BOSCH), the tool holder, in addition to the locking part(s), comprises at least one rotary carrier in the form of a key, and often two keys diametrically opposed with respect to each other.

So as to enable a drill bit to be used in the various types of commercial drilling machines, it has already been proposed to provide upon the drill bit rod firstly two diametrically opposed driving grooves and secondly, a locking groove and an opposing parallel axis driving groove located within the same diametrical plane with an opening towards the rear section thereof which is amply larger than the section of the locking groove.

A drill bit fitted out as above can also be properly fitted into both tool holders of the type described in the patent FR 1 588 841 (HILTI) and into the types of tool holders described in the patent FR 76 34 195 (BOSCH), namely with one or two locking balls or one or two driving keys. However, in 50% of the cases, this drill bit may not be retained within tool holders with one locking ball, as the ball is then present within the driving groove which is fully open towards the rear.

SUMMARY OF THE INVENTION

So as to ensure that the ball is retained in all the positions according to the invention, provision has been made for the drill bit to firstly include two diametrically opposed locking grooves and secondly, also diametrically opposed, a driving groove and a third locking groove upon which is superimposed, and with its axis disposed parallel thereto, a second driving groove.

But the associated superimposed driving groove creates in the locking groove an opening in its rear extremity surface, which only prohibits the passage of the ball by means of the stops formed by means of the two transition zones defined between the edges of the locking groove and those of the rear part of the driving groove.

These two zones, having regard to the normal dimensions of the two grooves, form two stop projections with small dimensions and whose difficult working conditions involve relatively quick wear and thus risk the unlocking of the drill bit.

In order to overcome this serious drawback, the invention also serves to angularly offset the driving groove with respect to the locking groove in such a way as to reduce one of the projections in favor of the other whose increased depth will then ensure sound locking of the drill bit.

Advantageously, in the drill bit driving zone, the driving groove is offset so as to have the lateral faces of the two associated superimposed locking and driving grooves almost merge, or in other words to virtually annul the projection corresponding to the driving zone so as to extend the friction zone onto a larger surface.

BRIEF DESCRIPTION OF THE DRAWINGS

The annexed drawings illustrate an example, in no way restrictive, of an improved drill bit constructed according to the present invention, in which like reference characters designate like or corresponding parts throughout the several views, and wherein.

DETAILED DESCRIPTION OF THE INVENTION

Figure 1:
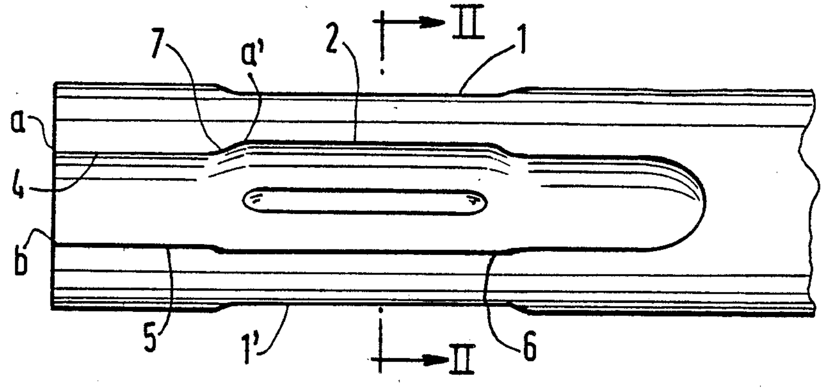
FIG. 1 is a partial side view of the drill bit showing the two associated or superimposed locking and driving grooves.
Figure 2:
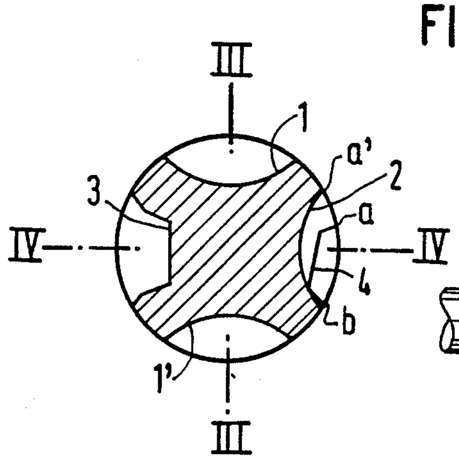
FIG. 2 is a cutaway view along the line II—II of FIG. 1.
Figure 3:
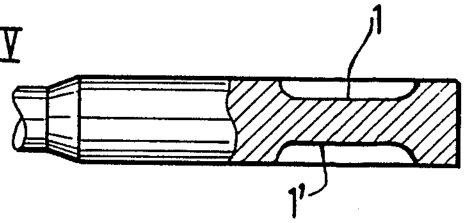
FIG. 3 is a reduced-scale cutaway view along the line III—III of FIG. 2.
Figure 4:
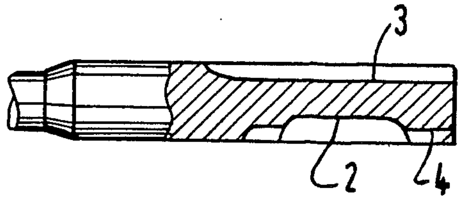
FIG. 4 is a reduced-scale cutaway view along the line IV—IV of FIG. 2.

In the example shown, the drill bit comprises two diametrically opposed locking grooves 1, 1', a third locking groove 2 disposed at 90° with respect the first two locking grooves, a driving groove 3 almost diametrically opposite the locking groove 2 and a second driving groove 4 with a longitudinal axis parallel to that of the groove 2, but circumferentially radially offset from the latter by 5°.

Inside the driving zone (b) of the drill bit, this offsetting of the axis of the groove 4 results in the lateral faces 5 and 6 of the two grooves 2 and 4 almost merging and, on the other hand in the opposed zone, in transitionally providing between the lateral faces (a) and (a') a projecting surface 7 adequately ensuring that the drill bit is retained by means of the arrested travel of the ball against this surface 7.

Obviously, many modifications and variations of the present invention are possible in light of the above teachings. It is therefore to be understood that within the scope of the appended claims, the present invention may be practiced otherwise than as specifically described herein.

What is claimed is:

1. A drill bit, comprising:
two diametrically opposed locking grooves;
a first driving groove disposed substantially diametrically opposite a third locking groove; and
a second driving groove superimposed upon, and angularly offset in a circumferential direction with respect to, said third locking groove such that a first lateral edge of said third locking groove projects beyond a first lateral edge of said second driving groove, in said circumferential direction, so as to define therebetween drill bit locking projections, while a second lateral edge of said third locking groove is substantially co-linear with a second lateral edge of said second driving groove so as to be substantially merged therewithin within a drill bit driving zone while simultaneously effectively extending a drill bit friction zone so as to increase the wear resistance thereof and thereby enhance the service life of said drill bit.

2. A drill bit as set forth in claim 1, wherein:

said first and second locking grooves are disposed along a diametrical extent which is substantially perpendicular to a diametrical extent along which said first driving groove and said third locking groove are disposed.

3. A drill bit as set forth in claim 1, wherein:

said second driving groove is angularly offset in said circumferential direction with respect to said third locking groove by means of 5°.

4. A drill bit as set forth in claim 1, wherein:

said second driving groove has a longitudinal extent which is greater than the longitudinal extent of said third locking groove.

* * * * *